United States Patent [19]

Hakkaku et al.

[11] Patent Number: 4,614,949

[45] Date of Patent: Sep. 30, 1986

[54] TRANSFER-TYPE THERMAL PRINTER

[75] Inventors: Kunio Hakkaku, Hadano; Yoh Matsushita, Yokohama; Takahiko Tokumasu, Atsugi; Toshio Yamamoto, Yokohama, all of Japan

[73] Assignee: Ricoh Company, Ltd., Tokyo, Japan

[21] Appl. No.: 661,378

[22] Filed: Oct. 16, 1984

[30] Foreign Application Priority Data

| | | | |
|---|---|---|---|
| Oct. 20, 1983 | [JP] | Japan | 58-196513 |
| Oct. 20, 1983 | [JP] | Japan | 58-196514 |
| Oct. 20, 1983 | [JP] | Japan | 58-196515 |
| Oct. 24, 1983 | [JP] | Japan | 58-198470 |
| Oct. 24, 1983 | [JP] | Japan | 58-198471 |

[51] Int. Cl.[4] .......... G01D 15/10

[52] U.S. Cl. .......... 346/76 PH; 346/145; 346/105; 400/356; 400/246

[58] Field of Search .......... 346/76 PH, 76 R, 145, 346/136, 105; 400/224.2, 355–358, 118–126, 242, 246, 708; 250/319; 101/136; 73/431; 219/216 PH; 242/55.2, 55.3, 55.53

[56] References Cited

U.S. PATENT DOCUMENTS

| | | | |
|---|---|---|---|
| 4,388,008 | 6/1983 | Greene et al. | 400/625 |
| 4,507,667 | 3/1985 | Tsuboi | 346/76 PH |

*Primary Examiner*—Arthur G. Evans

*Attorney, Agent, or Firm*—Cooper, Dunham, Griffin & Moran

[57] ABSTRACT

A transfer type thermal printer includes a heat sensitive ink ribbon which is fed along an ink ribbon feeding path, a part of which is defined as a recording section, a thermal printhead and a platen roller, both located at the recording section in pressure contact with the ink ribbon sandwiched therebetween. A paper transporting path is defined in the printer for transporting a sheet of recording paper through the recording section where the recording paper is passed between the printhead and the platen roller in surface contact with the ink ribbon. A main feature of the present printer includes a housing which is generally divided into two: upper housing half and lower housing half, and the upper housing half is pivotted to the lower housing half at one end so that the upper housing half may be pivotted open or closed with respect to the lower housing half with the printhead being mounted in the upper housing half and the platen roller being disposed in the lower housing half.

20 Claims, 8 Drawing Figures

TRANSFER-TYPE THERMAL PRINTER

BACKGROUND OF THE INVENTION

1. Field of the Invention

This invention generally relates to a thermal printer for printing an image, such as a character and symbol, by applying a heat pattern of an image to be printed to a recording medium, and, in particular, to a transfer type thermal printer in which a heatsensitive ink ribbon is used to transfer ink in the form of a desired heat pattern applied by a thermal printhead to a recording medium.

2. Description of the Prior Art

A transfer type thermal printer is well known in the art. In such a printer, a heatsensitive ink ribbon is placed as sandwiched between a recording medium, typically plain paper, and a thermal printhead, and, according to a heat pattern created on the thermal printhead in accordance with an image signal supplied thereto, the ink on the ink ribbon is selectively melted and transferred to the recording medium thereby forming a printed image on the recoding medium by the transferred ink. Such a transfer type thermal printer has numerous advantages, including capability of providing a printed image of excellent quality, high printing speed and quiet operation. Accordingly, it has been and is being actively applied as an output device of computer and/or word-processor system, or as a recording section of facsimile machine.

An ink ribbon or sheet used in such a transfer type thermal printer includes a base of thin resin film, paper or the like and an ink layer formed on the base. When manufacturing such an ink ribbon, the ink is first applied to the base as being heated to be in a melted condition and then it is cooled to the room temperature to solidify. The ink forming the ink layer is thus in a solid state at room temperature, and, thus, the ink is not transferred to any object even if it is brought into contact therewith. On the other hand, if the ink is heated above a predetermined temperature, it melts and becomes easily transferred to an object which is brought into contact therewith.

The thermal printhead contacts the ink ribbon at its base side so that a heat pattern created by the thermal printhead is applied to the ink layer as conducted through the base. Thus, in order to maintain a high printing speed and to reduce energy consumption, it is desirous to make the base of ink ribbon as thin as practically possible thereby allowing to increase the rate of heat transfer to the ink layer through the base under a given condition. Since the ink layer itself is already substantially thin, when the base is made thinner, the entier ink ribbon is made thinner. For this reason, extremely thin heatsensitive ink ribbons have recently become commercially available.

However, in prior art transfer type thermal printers, it has been noted a difficulty in setting such a heatsensitive ink ribbon ready for operation. It is more often than not that the ink ribbon becomes creased or twisted while it is being set in position, which could then cause malfunctioning in ink ribbon feeding operation and/or printed image of poor quality. Moreover, in such prior art printers, when the ink ribbon jams during operation, it is not easy to remove a sheet of recording paper on which printing has been carried out from the printer and the ink ribbon could be easily damaged while this sheet of recording paper is being removed. Thus, if such jamming occurs in a prior art printer, it could be rectified only with a great difficulty.

SUMMARY OF THE INVENTION

It is therefore a primary object of the present invention to obviate the disadvantages of the prior art as described above and to provide an improved transfer type thermal printer.

Another object of the present invention is to provide an improved transfer type thermal printer which is easy for an operator to handle.

A further object of the present invention is to provide an improved transfer type thermal printer capable of providing a printed image of high quality and fast and quiet in operation.

A still further object of the present invention is to provide an improved transfer type thermal printer which is so structured to facilitate setting of ink ribbon in position and removal of jammed recording medium.

A still further object of the present invention is to provide an improved transfer type thermal printer which is reliable in operation, increased in convenience in usage and easy in maintenance.

Other objects, advantages and novel features of the present invention will become apparent from the following detailed description of the invention when considered in conjunction with the accompanying drawings.

DESCRIPTION OF THE PREFERRED EMBODIMENTS

A transfer type thermal printer according to the present invention has numerous advantages over the prior art printers of the same kind, which include the following features.

In the first place, the entire structure of the present printer is generally divided into upper and lower halves with a separation line being generally defined by a passage for ink ribbon and the upper half is pivotted to the bottom half at one end thereby allowing the upper half to be pivotted open or closed with respect to the bottom half. Second, the present printer includes a platen roller and a thermal printhead with a laminate of ink ribbon and recording medium sandwiched therebetween, in which the thermal printhead is provided in the upper half of the printer with the platen roller being provided in position in the lower half. The platen roller is driven to rotate intermittently thereby causing the laminate of ink ribbon and recording medium to move with respect to the thermal printhead.

With such a structure, in which the upper half of the printer may be pivotted open or closed with respect to the bottom half at a separation line defined by the ink ribbon passage, the ink ribbon may be set in position or removed easily as well as securely, and, moreover, a jammed recording medium within the printer may be easily removed. It should also be noted that the platen roller is provided in the lower half of the printer. The platen roller is driven to rotate in an intermittent manner to have a laminate of ink ribbon and recording medium advance with respect to the thermal printhead. For this reason, high accuracy is required in implementing the intermittent rotation of platen roller, which then requires a structure in which the platen roller is driven by a driving motor directly. Thus, if the platen roller were to be provided in the upper half of the printer, then it would also require that its driving motor be provided in the upper half. This is apparently disadvantageous because such a driving motor is commonly heavy in weight thereby causing the pivotal motion of the upper half with respect to the lower half to be difficult to carry out. No such a problem arises if the platen roller is provided in the lower half according to the teachings of the present invention.

Figure 1:
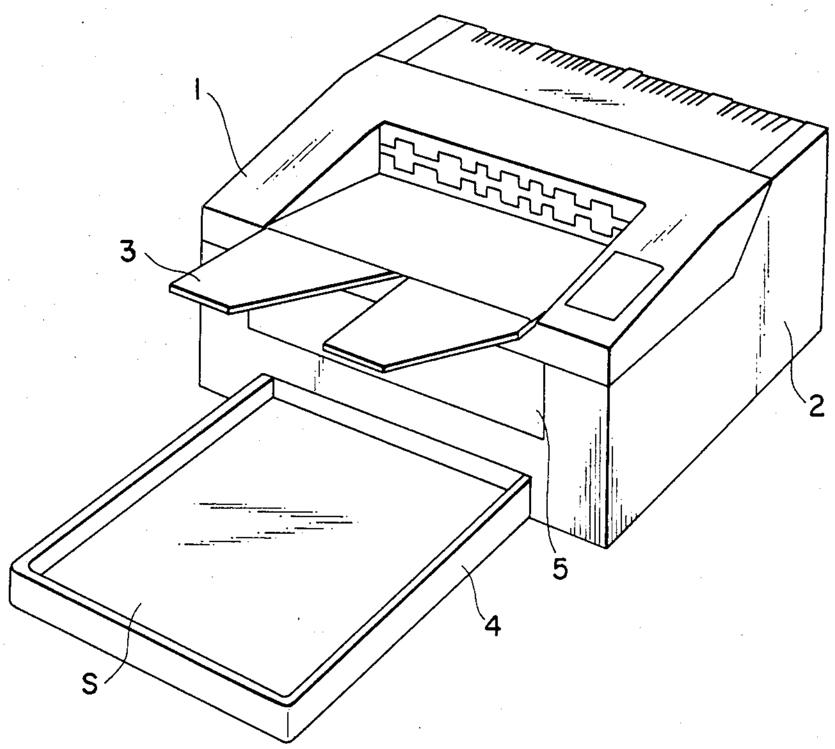
FIG. 1 is a perspective view showing a transfer type thermal printer constructed in accordance with one embodiment of the present invention.

Referring now to FIG. 1, there is shown in perspective a transfer type thermal printer constructed in accordance with one embodiment of the present invention. As shown, the present thermal printer includes an upper cover 1 generally defining an upper half, a main housing 2 generally defining a lower half, a tray 3, a cassette 4 detachably mounted in the printer for storing a stack of recording paper S and a door member 5. As will become clearer later, the upper cover 1 is pivotted to the main housing 2 at one end so that the upper cover 1 may be pivotted open or closed with respect to the main housing 2. The tray 3 is also detachably mounted on the upper cover 1.

As the recording paper S, use may be preferably made of plain paper; however, use may, of course, be made of any other appropriate material, such as a film of resin. Various sizes of recording paper S may also be used and a number of cassettes 4 are preferably prepared for storing differently sized sheets of recording paper S, one cassette for each size. It should be noted that throughout the present specification the length of a sheet of recording paper S in the direction perpendicular to the direction of transportation of the recording paper S within the printer will be referred to as the width of recording paper S and this direction will be referred to as the widthwise direction of recording paper S irrespective of the size of recording paper S used. It is so structured that the recording paper S is always positioned with its center in its widthwise direction aligned with a predetermined position when its cassette 4 is detachably mounted in position irrespective of the size of recording paper S used. That is, in the illustrated embodiment, the center of a sheet of recording paper S used is used as a reference in operation, which may be termed as a center reference system.

Although not shown specifically, it should be understood that each cassette 4 is provided with a means for producing a particular magnetic field pattern depending on the size of a sheet of recording paper S to be stored therein. And, thus, when the cassette 4 is mounted in position, this particular magnetic field pattern may be detected by a detector provided in the main housing 2. Accordingly, the size of a sheet of recording paper S set ready for operation may be automatically detected and the operating or scanning range of a thermal printhead is automatically set in accordance with the detected with of recording paper S set ready for operation. As with become clearer later, it is to be noted that a separate sheet of recording paper S other than those stored in the cassette 4 mounted in position may be manually fed for use in printing operation with the cassette 4 set in position. In this case, the door member 5 must first be pivotted open to allow manual insertion of recording paper S sheet by sheet.

Figure 2:
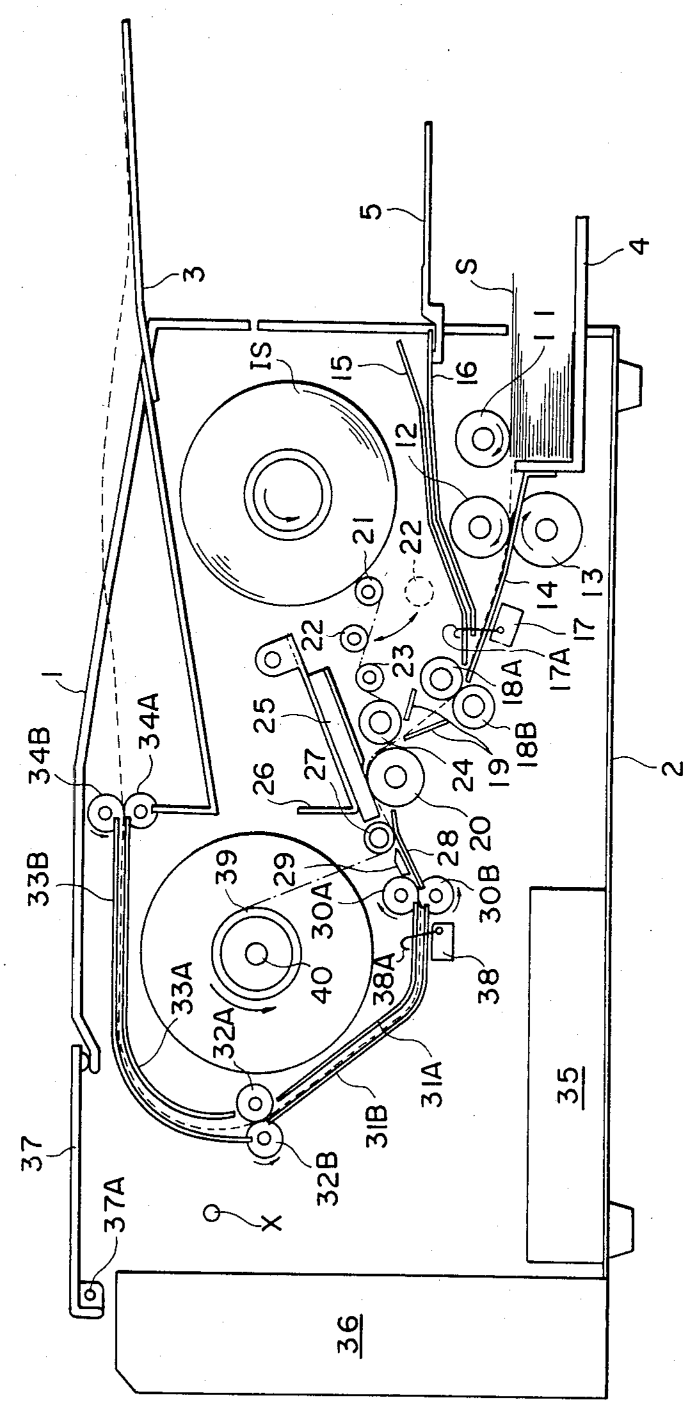
FIG. 2 is a schematic illustration showing the internal structure of the printer shown in FIG. 1.

Referring now to FIG. 2, which illustrates the overall arrangement of various components provided in the present printer, a feed roller 11 is disposed such that it comes into contact with the topmost sheet of recording paper S when the cassette 4 is detachably mounted in position and it is driven to rotate in the clockwise direction intermittently to feed the topmost sheet of recording paper S. The feed roller 11 is preferably comprised of a plurality of roller segments fixedly supported on a common shaft as spaced apart from one another along the shaft. Besides, the feed roller 11 is preferably comprised of rubber at least at its peripheral surface, thereby allowing to secure a sufficient frictional force against the topmost sheet of recording paper S when brought into contact therewith.

Downstream of the feed roller 11 with respect to the direction of advancement of recording paper S is disposed a transportation roller 12 which is driven to rotate clockwise to have the recording paper S transported along a predetermined transportation path defined in the printer. Also disposed generally below the transportation roller 12 is a back-up roller 13. The rollers 12 and 13 are also each preferably comprised of a plurality of roller segments fixedly supported on a common shaft as spaced apart from one another similarly with the feed roller 11. Furthermore, these rollers 12 and 13 are also each preferably comprised of rubber at least at its peripheral surface in order to secure a sufficient friction against the recording paper S when in contact. It is to be noted that the back-up roller 13 rotates couterclockwise when driven and this is the roller which causes the accompanying sheets of recording paper S to return to the cassette 4 thereby insuring that sheets of recording paper S may be fed and transported one by one. This aspect will be described more in detail later.

A guide plate 14 is provided as extending from one end of the cassette 4 in position to the vicinity of the location where registration rollers 18A and 18B are disposed, thereby defining part of the passage for transporting the recording paper S within the printer. Also provided is a pair of guide plates 15 and 16 which extend in parallel between the pivotal point of door member 5 and the location where the registration rollers 18A and 18B are disposed, thereby defining another passage for transporting a sheet of recording paper S which is inserted into the printer manually. Thus, the forward ends of guide plate 14 and the paired guide plates 15 and 16 meet at a point between the rollers 18A and 18B thereby defining an inlet point to the paired rollers 18A and 18B.

A paper sensor 17 is disposed near the point where the above-described two paper transporting passages meet and it has a feeler or actuator 17A extending generally upwardly across the two paper passages. Of course, the guide plates 14–16 are suitably cut-away to allow the actuator 17A to pivot around the sensor 17 when it is pushed forward through engagement with the leading edge of a sheet of recording paper S in transportation. It should also be appreciated that the actuator 17A extends long enough to be actuated by a sheet of recording paper S which is transported either through the lower passage from the cassette 4 or through the upper passage as inserted manually.

The registration rollers 18A and 18B are normally in contact with the roller 18A being used as a driving roller and the roller 18B as a follower roller. The roller 18A at the driving side is comprised of rubber at least at its peripheral surface, whereas the roller 18B at the follower side is comprised of stainless steel. As shown in FIG. 2, a center-to-center line between the rollers 18A and 18B is inclined with respect to a vertical line, and the forward end of the guide plate 14 is located somewhat below the nip between the two rollers 18A and 18B thereby insuring that a sheet of recording paper S may be smoothly inserted into the nip between these rollers. The guide plate 14 extends as inclined rising gradually from its end adjacent to the feed roller 11 toward its forward end adjacent to the nip between the registration rollers 18A and 18B.

Downstream of the registration rollers 18A and 18B with respect to the direction of advancement of a sheet of recording paper S is disposed another pair of guide plates 19 arranged convergent toward their forward ends to define part of passage for transporting a sheet of recording paper S from the registration rollers 18A and 18B toward a platen roller 20, which is rotatably supported on the main housing 2. The platen roller 20 is comprised of rubber at least at its peripheral surface and coupled to a step motor (not shown) for intermittent rotation in either direction selectively.

Opposite to the platen roller 20 is disposed a thermal printhead 25 which is generally elongated in shape extending in the direction perpendicular to the plane of the drawing. The thermal printhead 25 has a structure which is well known for one skilled in the art and thus its detailed description will be omitted here. Briefly stated, the thermal printhead 25 includes an elongated rectangular substrate on which a plurality of heat-producing elements, e.g., electrical resistors, are arranged in the form of a single array at a predetermined pitch, and the heat-producing elements are selectively activated in accordance with an image signal supplied thereto to produce a heat pattern, which is then applied to an ink ribbon for recording as will become clear later. Here, that portion of the thermal printhead where the array of heat-producing elements is provided will be called write-in section.

The thermal printhead 25 is supported on a support bracket 26 as fixedly attached thereto, and during recording operation, the platen roller 20 is pressed against the thermal printhead 25, more precisely against the write-in section of printhead 25, across its full width with a laminate of ink ribbon IS and recording paper S sandwiched therebetween. It is to be noted that a pressure contact section between the platen roller 20 and the thermal printhead 25 will be called recording section in this specification.

A further guide plate 28 is disposed at the downstream side of the recording section and it defines a passage for transportation of recording paper S from the recording section to a nip between a pair of paper discharge rollers 30A and 30B. A separating pawl 29 is disposed adjacent to the guide plate 28 and it serves as an auxiliary means for securing separation of a sheet of recording paper S from the ink ribbon IS after recording. As shown in FIG. 2, a plurality of pairs of paper discharging rollers 30A-30B, 32A-32B and 34A-34B and a plurality of pairs of guide plates 31A-31B and 33A-33B are disposed at appropriate positions to define a paper discharging passage extending from the forward end of guide plate 28 to the tray 3, along which a sheet of recording paper S on which a desired image has been printed is transported.

The paper discharging rollers 30A-30B, 32A-32B and 34A-34B are preferably each comprised of a plurality of roller segments generally in the shape of discs fixedly supported on a common shaft spaced apart from one another along the shaft. The rollers 30A, 32A and 34A are follower rollers and preferably comprised of a material, such as resin and aluminum, which is difficult to be contaminated with ink. On the other hand, the rollers 30B, 32B and 34B are driving rollers and they are preferably comprised of a material, such as rubber, which has a sufficiently large frictional coefficient against the recording paper S used. In the preferred embodiment, all of these paper discharging rollers 30, 32 and 34 are driven to establish an equal paper transportation speed at each position, which is faster than the paper transportation speed established by the platen roller 20 or a relay roller 27.

Thus, a sheet of recording paper S after transporting along the upper feed passage if inserted manually or along the lower feed passage if fed from the cassette 4 is transported toward the recording section defined between the platen roller 20 and the thermal printhead 25 as driven by the registration rollers 18A and 18B and guided by the guide plates 19, and recording is effected to the sheet of recording paper S as it moves past the recording section. Then, the recording paper S is transported to the paper discharging passage as guided by the guide plate 28, and, thereafter, the recording paper S is discharged onto the tray 3 after having been transported along the passage defined by the rollers 30, 32 and 34 and the guide plates 31 and 33. The paper transportation passage from the cassette 4 to the tray 3 is indicated by the dotted line in FIG. 2.

A second paper sensor 38 is disposed immediately downstream of the paper discharging rollers 30A and 30B for detecting entrance of recording paper S into the paper discharging passage, and the sensor 38 has a pivotally supported actuator 38A which traverses the paper discharging passage so as to detect the passage of recording paper S by physical engagement therewith. For this purpose, the guide plates 31A and 31B are partly cut-away to accommodate the pivotal motion of actuator 38A when it is pushed forward by coming into engagement with the advancing recording paper S.

The ink ribbon IS is originally stored in the form of a roll and it is rotatably supported in the upper half of the printer. The ink ribbon IS lead out of the roll passes around a first guide pipe 21 at its underside, around a second guide pipe 23 at its top side and then around a third guide pipe 24 at its underside, and, after passing through the recording section, it passes around the relay roller 27 at its underside to reach a take-up spool 39 fixedly mounted on a take-up shaft 40. Thus, the ink ribbon IS is wound around the take-up spool 39 as the take-up shaft 40 is driven to rotate counterclockwise. It is to be noted that the take-up shaft 40 is provided in the lower half or main housing of the present printer. The transporting path for ink ribbon IS from the supply roll to the take-up spool 39 is indicated by the one-dotted line in FIG. 2.

The guide pipe 21 is rotatably mounted on the printer upper half. On the other hand, the guide pipe 22 is rotatably supported at the free end of an arm (not shown) whose base end is pivotally supported at a shaft for rotatably supporting the guide pipe 21. As a result, the guide pipe 22 is not only rotatale around its own rotating axis, but also is pivotally movable between the position indicated by the dotted line and the solid line. The guide pipe 22 thus contacts the ink ribbon IS at its top surface, i.e., the back surface of the ink ribbon where the base is provided. The guide pipe 23 on the other hand is rotatably mounted on the printer lower half or main housing 2; however, the guide roller 24 is rotatbly mounted on the printer upper half and it is preferably comprised of foam rubber to be low in hardness but larger in outer diameter.

The relay roller 27 is preferably comprised of rubber or foam rubber at least at its surface so as to provide a sufficient power transmitting ability due to frictional contact with the base of ink ribbon IS, and it is preferably driven to rotate to establish the paper transportation speed which is larger than the paper transportation speed established by the platen roller 20 by 1–10%. A control unit 35 is mounted on the bottom plate of main housing 2 and it includes various electronics components, such as CPU, which are mounted on printed circuit boards. It should be understood that the present printer includes two driving motors (not shown), one of which is the previously described step motor and the other is a common motor for use in continuous rotation.

Now, the above-described various components of the present printer will be described as divided between the printer upper and lower halves. As described previously, the printer upper half, which is mainly defined by the upper cover 1 and its frame structure (not shown), is pivotted at a pivot X to the printer lower half, which is mainly defined by the main housing 2 and its frame structure (not shown), so that the upper half may be pivotted open or closed with respect to the printer lower half. The printer upper half is provided with the guide pipe 21, tension pipe 22, guide roller 24, thermal printhead 25, relay roller 27, paper discharging rollers 32A, 32B, 34A and 34B and guide plates 33A and 33B. It should be noted that the ink ribbon IS is operatively set in the printer upper half as described previously. The remaining components, including the platen roller 20, are all provided in the printer lower half.

Figure 3:
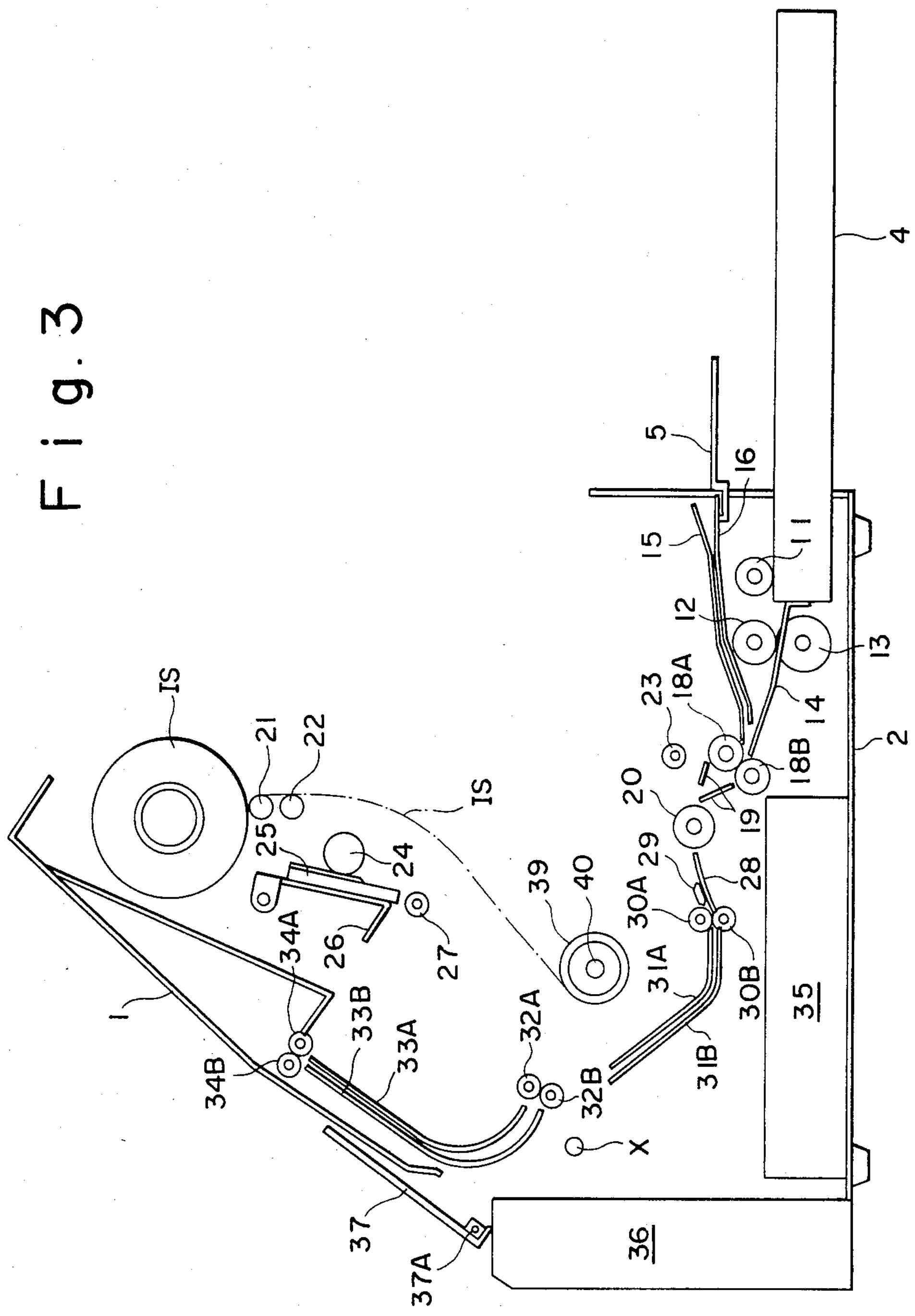
FIG. 3 is a schematic illustration showing how an upper half of the printer of FIG. 1 may be pivotted open with respect to the rest of the printer.

Thus, when the printer upper half or upper cover 1 is pivotted open around the pivot X as if an alligator yawns, as shown in FIG. 3, the printer separates into the upper and lower halves along the ink ribbon transporting passage defined within the printer as indicated by the one-dotted line in FIG. 2. An auxiliary cover 37 is pivotted to the lower half at a pivot 37A and its free end rests on the upper cover 1, so that when the upper cover 1 is pivotted open, the auxiliary cover 37 also pivots following the movement of the upper cover 1, as shown in FIG. 3.

It will now be described as to a mechanism for driving the various components of the printer. As described previously, the present printer is provided with a step motor as well as a common motor, though these motors are not specifically shown in the drawings. It should, however, be understood that these motors are mounted in the main housing 2. The step motor is used for transmitting driving power to the platen roller 20, relay roller 27 and take-up shaft 40, wherein the platen roller 20 and relay roller 27 are directly driven by the step motor but the take-up shaft 40 is driven at constant torque by the step motor through a well-known frictional coupling. On the other hand, the common motor is used for transmitting driving power to the feed roller 11, transporting roller 12, back-up roller 13, registration roller 18A at the driving side and paper discharging rollers 30B, 32B and 34B at the driving side. In this case, the back-up roller 13 and paper discharging rollers 30B, 32B and 34B are driven at constant torque by the common motor through a well-known frictional coupling.

As is obvious for those skilled in the art, the operation of each of the rollers is controlled at predetermined timing using electromagnetic clutches or the like. Furthermore, control over printing process is provided by the control unit 35, which has a structure schematically shown in block form in FIG. 4.

Figure 4:
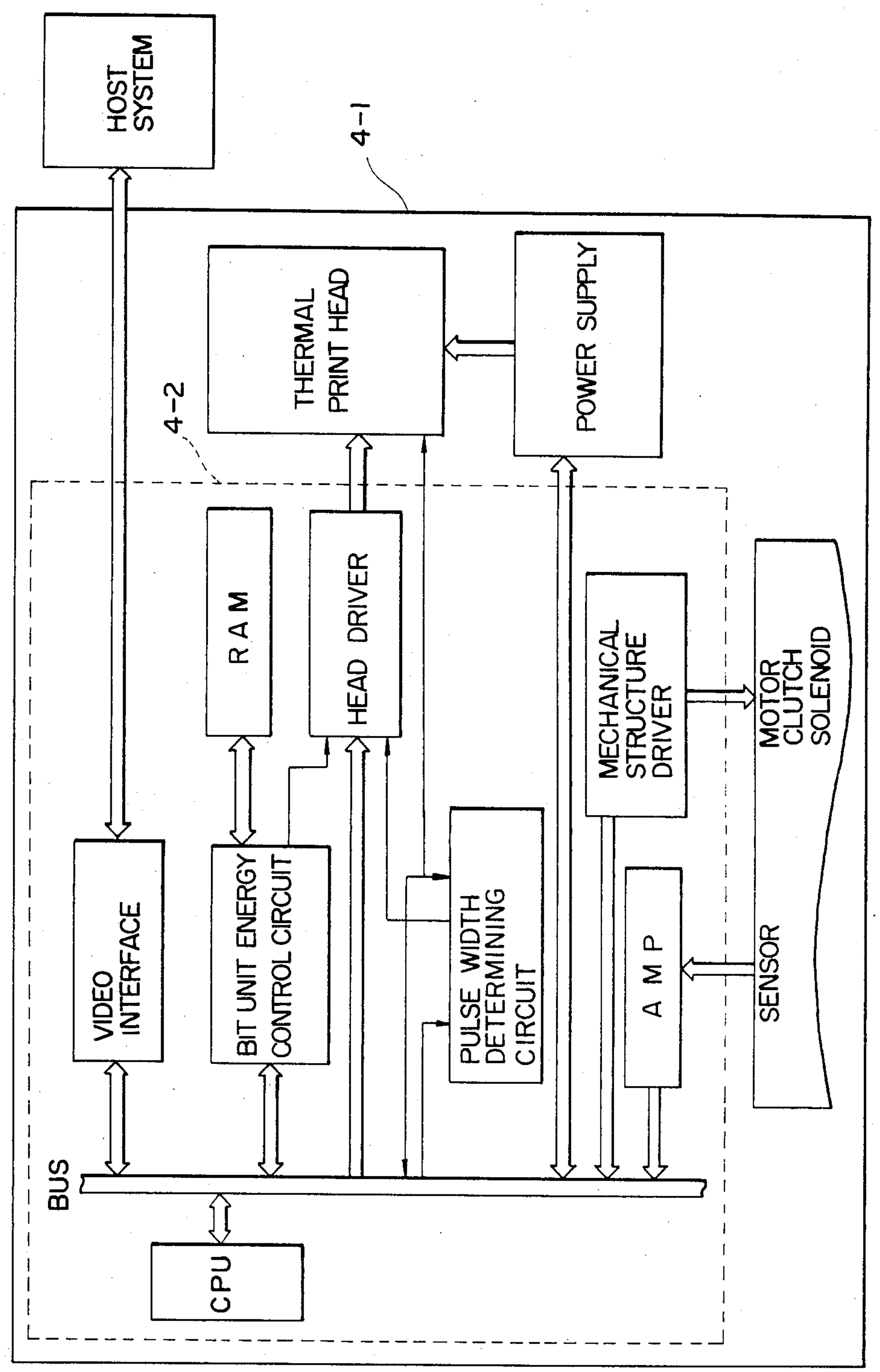
FIG. 4 is a block diagram showing a print control system incorporated in the printer of FIG. 1.

Referring now to FIG. 4, a section enclosed by the solid line 4-1 indicates the present transfer type thermal printer and it is shown to be connected to a host system, which is a system for supplying an image signal to be printed to the present printer 4-1 and typically comprised of computer, wordprocessor, or any other type of communication unit. The printer system 4-1 includes a video interface through which the host system transmits and receives data to and from the printer system 4-1. A sub-section indicated by the dotted line 4-2 within the printer system 4-1 corresponds to the control unit 35, which is shown to include a CPU, video interface, bit unit energy control circuit, RAM, printhead driver, pulse width determining circuit, amplifier and mechanical structure driver. The printhead driver is connected to the thermal printhead 25 for selectively driving its array of heat-producing elements in accordance with an image signal to be printed. On the other hand, the mechanical structure driver is connected to drive such components as motors, clutches and solenoids. The bit unit energy control circuit and pulse width determining circuit will be described in detail later.

Now, a printing process carried out by the present transfer type thermal printer will be described in detail below.

In the first place, the upper cover 1 or printer upper half is pivotted open with respect to the main housing or printer lower half as shown in FIG. 3, and the ink ribbon IS in the form of a roll is set in position in a holding mechanism (not shown) provided in the printer upper half with the take-up spool 39, to which the leading end of the ink ribbon IS is fixedly attached, being fitted onto the take-up shaft 40. Upon completion of setting the ink ribbon IS in position in this manner, the upper cover 1 is pivotted closed around the pivot X, thereby establishing the condition shown in FIG. 2.

Under the condition, when a printing mode is turned on, a lift mechanism (not shown) is set in operation to lift the forward end portion of a stack of recording paper S stored in the cassette 4 to bring the topmost sheet of recording paper S into pressure contact with the feed roller 11. Subsequently, the feed roller 11, transporting roller 12 and back-up roller 13 are set in operation to be driven to rotate in the respective directions indicated by the arrows in FIG. 2. It is to be noted that since a frictional coupling is provided between the back-up roller 13 and its driving source, when the back-up roller 13 is in contact with the paper transporting roller 12, the back-up roller 13 rotates counterclockwise due to contact with the transporting roller 12 with a slippage produced in the frictional coupling.

The clockwise rotation of feed roller 11 causes the topmost sheet of recording paper S to be discharged out of the cassette 4. The topmost sheet of recording paper S thus discharged from the cassette 4 comes into engagement with the transporting roller 12 which then causes this recording paper S to be transported along the guide plate 14. During this operation, there is slippage in the frictional coupling connected to the transporting roller 12.

Although it does not happen often, two or more sheets of recording paper S may be fed at the same time by the feed roller 11. Even so, through a cooperation between the transporting roller 12 and back-up roller 13, it is insured that only the topmost single sheet of recording paper S is allowed to be fed toward the registration roller 18. Described more in detail in this respect, designating a frictional force between the paper transporting roller 12 and recording paper S by $F_{F\text{-}P}$, a frictional force between two sheets of recording paper S by $F_{P\text{-}P}$ and a frictional force between the back-up roller 13 and recording paper S by $F_{R\text{-}P}$, in the preferred embodiment of the present invention, it is so structured to hold that $F_{F\text{-}P}$ is larger than $F_{P\text{-}P}$, $F_{R\text{-}P}$ is larger than $F_{P\text{-}P}$ and $F_{F\text{-}P}$ is larger than $F_{R\text{-}P}$. In the preferred embodiment, the relation of $F_{F\text{-}P}$ being larger than $F_{P\text{-}P}$ and $F_{R\text{-}P}$ being larger than $F_{P\text{-}P}$ is realized by forming each of the transporting roller 12 and back-up roller 13 with rubber at least at its peripheral surface. Besides, the other relation of $F_{F\text{-}P}$ being larger than $F_{R\text{-}P}$ is realized by setting the maximum power transmission torque of the frictional coupling connected to the back-up roller 13 to satisfy this relation. That is, when only a single sheet of recording paper S is transported as driven by the transporting roller 12, the back-up roller 13 rotates counterclockwise as driven by the recording paper S in contact therewith, in which case slippage is produced in the frictional coupling connected to the back-up roller 13.

With such a structure, even if two or more sheets of recording paper S happen to be discharged out of the cassette 4 to become pinched between the rollers 12 and 13, the back-up roller 13 changes its direction of rotation to rotate clockwise as indicated by the arrow in FIG. 3 thereby causing the half discharged sheets of recording paper S, excepting the topmost sheet, to be returned to the cassette 4. Accordingly, in the present structure, it is always insured that sheets of recording paper S stored in the cassette 4 are fed one by one toward the recording station.

In the most preferred embodiment in order to establish a stable transporting operation of recording paper S, the paper transportation speed determined by the transporting roller 12 is set faster than the speed determined by the feed roller 11 and yet the speed determined by the back-up roller 13 is set faster than these two speeds.

The recording paper S in engagement with the transporting roller 12 moves gradually upward along a slope defined by the guide plate 14 until its leading edge reaches the nip between the registration rollers 18A and 18B. During this movement, the recording paper S comes into contact with the actuator 17A thereby causing it to pivot to be kept out of the way. As described previously, the driver registration roller 18A is comprised of rubber at least at its peripheral surface and the follower registration roller 18B is comprised of stainless steel. These registration rollers 18A and 18B are not yet set in rotation when the leading edge of recording paper S comes into contact therewith. Since the forward end of guide plate 14 is located somewhat below the nip between the registration rollers 18A and 18B, the leading edge of recording paper S being transported first comes into contact with the roller 18A of stainless steel and it slides along the peripheral surface of this roller to finally reach the nip between the two rollers 18A and 18B smoothly.

The registration rollers 18A and 18B are driven to rotate after elapsing a predetermined time period as from the time when the sensor 17 is turned on by the pivotal motion of its actuator 17A. However, it is so structured that the registration rollers 18A and 18B start to rotate slightly after the leading edge of recording paper S having reached the nip between the rollers 18A and 18B. During this, the transporting roller 12 remains driven to rotate so that the recording paper S, which is obstructed in its forward movement with its leading edge in abutment against the nip between the tow rollers 18A and 18B, warps between the rollers 18A and 18B and the transporting roller 12.

Subsequently, the registration rollers 18A and 18B start to rotate so that the recording paper S resumes its advancing motion toward the recording section defined between the thermal printhead 25 and the platen roller 20. With such a structure, the recording paper S is once restrained its advancing motion thereby becoming warped, and, then, the registration rollers 18A and 18B are driven to rotate to resume the advancing motion of recording paper S, irregularities in orientation, such as skew, and timing of transportation, which may arise during the movement from the cassette 4 to the registration rollers 18A and 18B, can be properly absorbed and the recording paper S can be transported toward the recording section at proper timing and orientation.

It is to be noted that when the registration rollers 18A and 18B are set into rotation, the transporting roller 12 is set in a free state so that it rotates following the movement of recording paper S.

In the case where a sheet of recording paper S is to be inserted manually, it is fed into the passage defined between the guide plates 15 and 16 through an opening in the main housing 2, which may be opened or closed by the door member 5. The recording paper S thus inserted then comes into contact with the actuator 17A at its leading edge to cause it to pivot to move out of the way, and, then, advances until its leading edge reaches the nip between the registration rollers 18A and 18B. It is so structured that the registration rollers 18A and 18B are set into rotation after elapsing a predetermined time period as from the time when the sensor 17 is turned on due to the pivotal movement of the actuator 17A. In the preferred embodiment, if the length of passage from the position where the sensor 17 is turned on by the leading edge of recording paper S being transported to the nip between the registration rollers 18A and 18B is 20 mm, this predetermined time period is preferably set in a range between 0.5–1.5 seconds.

It is important that the time period from the point in time when the sensor 17 is turned on to the point in time when the registration rollers 18A and 18B are set in rotation should be set differently depending on whether the recording paper S is fed manually or from the cassette 4, and, thus, it is important that these two different paper feeding modes be discriminated accurately so as to insure proper operation. This aspect of the present invention will be described in detail later.

When the registration rollers 18A and 18B are set in rotation thereby causing the recording paper S to be transported toward the recording section, the platen roller 20 is driven to rotate counterclockwise thereby setting the leading edge of recording paper S at a start line of recording station, whereby the recording paper is brought into contact with the ink ribbon IS at least partly. When the recording paper S is so set at the recording station, the registration rollers 18A and 18B are set in a free state as being disconnected from the driving source. Then, the platen roller 20 is driven to rotate counterclockwise intermittently thereby causing a laminate of recording paper S and ink ribbon IS to advance along the thermal printhead 25 while being maintained as sandwiched between the platen roller 20 and the thermal printhead 25 under pressure.

At the same time, an image signal is supplied to the thermal printhead 25 so that the plurality of heat-producing elements provided in the printhead 25 are selectively activated to form a heat pattern according to the image signal supplied, which is then applied to the laminate of recording paper S and ink ribbon IS. In this case, when activated, the heat-producing element produces heat, temperature of which is approximately 300° C., momentarily. Thus, the heat thus produced is applied to the ink layer through the base, the ink layer selectively melts and becomes transferred to the recording paper S.

As described previously, variously sized sheets of recording paper S may be used in the present printer and each of these differently sized sheets is transported along the passage defined in the printer with its center line, extending in the direction of advancement, as a reference. Accordingly, in the case where the width of a sheet of recording paper S used is shorter than the total width or length of write-in section of thermal printhead 25, the active region of write-in section is so adjusted that an image signal is applied to those heat-producing elements which are located within the width of recoding paper S used. In the preferred embodiment, the image signal to be supplied to the thermal printhead 25 is masked corresponding to the width of recording paper S used, and timing of latching the signal into the printhead 25 is measured so as to carry out a proper printing operation in accordance with the width of recording paper S used.

When emerging from the recording section, the recording paper S is in adhesive contact with the ink ribbon IS through the melted ink of the ink ribbon which has been transferred to the recording paper S, but they are separated from each other at the relay roller 27. Described more in detail in this respect, since the ink ribbon IS is extremely thin, a significant difference in stiffness exists between the ink ribbon IS and recording paper S. Thus, by suddenly changing the direction of advancement of ink ribbon IS by means of the relay roller 27, since the recording paper S is larger in stiffness, it cannot follow the sudden change in the direction of movement of ink ribbon IS so that it separates away from the ink ribbon IS and moves along the guide plate 28 toward the nip between the paper discharging rollers 30A and 30B. The paper separating pawl 29 is disposed adjacent to the guide plate 28 and it serves to separate the recording paper S from the ink ribbon IS securely if such a separation fails to take place at the relay roller 27.

It is preferable to form the relay roller 27 as small as practically possible because it is intended to have the recording paper S separated away from the ink ribbon IS. The smaller the diameter of relay roller 27, the more secure in the operation of separating the recording paper S from the ink ribbon IS, so that it becomes possible to use recording paper S having less stiffness thereby allowing to increase the range of selection of recording paper S usable. After such separation, the ink ribbon IS is wound around the take-up spool 39. On the other hand, the recording paper S is transported along the paper discharging path defined by the rollers 30A–B, 32A–B and 34A–B and guide plates 31A–B and 33A–B and discharged out onto the tray 3. In this manner, there is obtained a sheet of recording paper S on which a desired image is printed by the thermally transferred ink.

It is to be noted that a common tangential plane defined at the nip between the paper discharging rollers 34A and 34B is not horizontal but somewhat inclined such that it gradually rises toward the right as viewing into FIG. 2. For this reason, the recording paper S is directed slightly obliquely upwardly when it is discharged out of the rollers 34A and 34B. Such a structure is advantageous since it can insure the formation of an excellent stack of printed recording paper S on the tray 3.

As described previously, when the actuator 38A is pivotted downward due to engagement with the recording paper S in transportation, the sensor 38 detects the leading edge thereof; on the other hand, when the actuator 38A is pivotted upward thereby returning to its original position due to disengagement with the recording paper S, the sensor 38 detects the trailing edge thereof. These detection signals are used to compare with predetermined values to determine as to whether jamming of the recording paper S has taken place or not and the time of completion of printing operation.

Upon completion of printing operation at the recording section, the ink ribbon IS, together with the recording paper S, advances to the separating position. And, if the next printing operation were carried out under the condition, that portion of the ink ribbon IS extending between the recording section and the separating section would be unused. Thus, in accordance with the present invention, after completion of separation of the recording paper S from the ink ribbon IS, the platen roller 20 is driven in the reversed direction thereby causing that portion of the ink ribbon IS extending between the separating portion and the recording portion to move backward until that portion of the ink ribbon IS currently located at the separation position returns to the recording position. In the case of a continuous recording operation, this partial backward feeding is carried out after separation of the last sheet of recording paper S. This aspect of partial backward feeding will be described further in detail later.

Now, various distinctive aspects of the present invention will be described in detail hereinbelow.

The first aspect relates to the manner of supplying a sheet of recording paper S. In the embodiment described above, a sheet of recording paper S may be fed in either of two ways: manual insertion and automatic feeding from the cassette 4. There is defined a pair of passages, one for a manually inserted recording paper S and the other for automatically fed recording paper S from the cassette 4. These passages extend into the interior of the main housing 2 in a convergent manner, and in the vicinity of a point where these passages meet is disposed the paper sensor 17. It is so structured that the registration rollers 18A and 18B are set into rotation after elapsing a predetermined time period as from the time when the sensor 17 is turned on by the downward pivotal motion of the actuator 17A through engagement with the leading edge of recording paper S in transportation.

However, since the transportation speed of recording paper S generally differs between the case when the recording paper S is manually fed and the case when the recording paper S is automatically fed from the cassette 4, there is a difference in timing for the leading edge of recording paper S to reach the nip between the registration rollers 18A and 18B as from the time when the sensor 17 has been turned on. Accordingly, it is necessary to change the length of time delay depending on whether the recording paper S has been fed manually or automatically from the cassette 4. If the length of time delay is to be changed depending on the manner of feeding recording paper S as in this case, it is necessary to select an appropriate delay time length by detecting the manner of feeding recording paper S in use. In the illustrated embodiment, detection of such manner of feeding recording paper S is carried out such that the feed roller 11 is examined as to whether it is being driven or not and a determination is made by combining the result of this examination and the state of sensor 17.

Explained more in detail in this respect, in the case where recording paper S is fed automatically from the cassette 4, the feed roller 11 is necessarily driven to rotate, and, therefore, whenever the feed roller 11 is driven to rotate, it is detected that recording paper S is fed from the cassette 4. On the contrary, in the case of manual feeding mode, the feed roller 11 is not driven to rotate. And, thus, if the sensor 17 is turned on without the feed roller 11 having been driven to rotate, it is immediately known that recording paper S has been fed manually.

As a result, a combination of feed roller 11, transporting roller 12 and back-up roller 13, in effect, constitutes an automatic paper feeding mechanism, and a driving signal to drive this automatic paper feeding mechanism is generated from the CPU in control unit 35 (see FIG. 4). When such an automatic feeding mode driving signal is generated, the automatic paper feeding mechanism is set in operation and the recording paper S stored in the cassette 4 is fed from the cassette 4 one by one automatically. Accordingly, the paper feeding mode may be determined as the automatic mode when such a driving signal is generated. On the other hand, in the case of manual feed mode, the sensor 17 is turned on without generation of such driving signal. Thus, the manual feed mode may be identified when the sensor 17 has been turned on without generation of automatic feeding mode driving signal.

The second aspect of the present invention relates to the relay roller 27. As described previously, the relay roller 27 is comprised at least at its peripheral surface of rubber or foam rubber, which has a sufficient frictional force against the ink ribbon IS, and it is driven to rotate by the step motor similarly with the platen roller 20 with its peripheral speed being set faster than the paper transportation speed set by the platen roller 20 by 1-10%, e.g., 5%. The following effects result with such a relay roller 27.

In the first place, it will contribute to feed the ink ribbon IS. That is, as described above, feeding of a laminate of recording paper S and ink ribbon IS through the recording section is effected by the platen roller 20. In other words, the platen roller 20 contacts the back side of recording paper S to have it transported through the recording section. In this case, the ink ribbon IS is transported together with the recording paper S through a frictional force between the ink ribbon IS and recording paper S. In this manner, since feeding of ink ribbon IS through the recording section relies on the friction against the recording paper S, if use is made of recording paper S having a small frictional coefficient against the ink ribbon IS, there may arise malfunction in feeding the ink ribbon IS due to slippage between the ink ribbon IS and recording paper S.

However, since the relay roller 27 possesses a sufficient frictional force transmitting capability against the ink ribbon IS and yet its peripheral speed is set faster than the paper transportation speed established by the platen roller 20, the relay roller 27 produces a force which tends to pull the ink ribbon IS forward, which contributes to guarantee secure feeding of ink ribbon IS through the recording section. Since the peripheral speed of relay roller 27 is larger than the transportation speed of ink ribbon IS at the recording section, the relay roller 27 slips on the ink ribbon IS thereby applying a force tending to pull the ink ribbon IS forward.

Second, due to the force tending to pull the ink ribbon IS forward, the ink ribbon IS, together with the recording paper S, is set in tension between the relay roller 27 and the recording section. Such a structure contributes to prevent formation of creases in ink ribbon IS and/or recording paper S and to enhanced separation of recording paper S from the ink ribbon IS.

Third, it may prevent irregularities in feeding of recording paper S and/or ink ribbon IS from occurring. That is, after printing, the ink ribbon IS is wound around the take-up spool 39; however, as described above, since the take-up spool 39 is driven at constant torque through the frictional coupling by the step motor, the force for pulling the ink ribbon IS to be wound around the take-up spool 39 is larger when the diameter of the ink ribbon IS wound around the take-up spool 39 is smaller, but this force becomes smaller as the diameter of the ink ribbon IS wound around the take-up spool 39 becomes larger. In the case of absence of relay roller 27, such a change in pulling force is directly transmitted to the recording section thereby causing irregularities in feeding. However, provision of relay roller 27 allows to prevent such irregularities from occurring. It is to be noted that instead of driving the relay roller 27 directly by the step motor, it may be driven to rotate indirectly through a suitably friction coupling mechanism.

The third distinctive aspect of the present invention relates to paper discharging rollers 30A and 30B. As described previously, the paper discharging rollers 30B, 32B and 34B at the driving side come into contact with the back side of recording paper S and they are comprised of a material having a sufficient frictional force transmitting capability against the recording paper S, such as rubber or the like, at least at their peripheral surfaces. Each of these driver side rollers is driven to rotate by means of the common motor through a frictional coupling and its peripheral speed for transportation of recording paper S is set faster than the peripheral speed of relay roller 27. The peripheral speeds of these rollers 30B, 32B and 34B are identical. On the other hand, follower side rollers 30A, 32A and 34A are comprised of a material, such as resin and aluminum, which is difficult to be contaminated by ink.

Since the roller 30B is larger in peripheral speed than the platen roller 20 and relay roller 27, the recording paper S is maintained in tension on the guide plate 28 so that any formation of crease in this section is prevented from occurring. In addition, since the rollers 30A, 32A and 34A are difficult to be contaminated by ink, the ink on the recording paper S hardly sticks to these rollers so that the so-called offset printing phenomenon of the ink on the recording paper S once sticking to one of these rollers and again back to the recording paper S is advantageously prevented. Moreover, since each of the rollers 30A, 32A and 34A causes the recording paper S to be transported at the same speed, there is no danger that the printed image formed on the recording paper S by the transferred ink is scrubbed against the guide plates 31A and 33A.

In general, in the case of transporting a sheet type object, it is common practice to set the speed of transportation faster as it goes further downstream so as to keep the sheet type object in tension thereby attaining stability in transportation. If this were applied to the present paper discharging passage for recording paper S, since the passage is curved significantly, the recording paper S would be pulled in tension, for example, when extending between the rollers 30A–30B and 32A–32B, whereby the printed image on the recording paper S would be scrubbed against the guide plate 31A thereby smearing or damaging the printed image. No such problem arises in the present invention because all of the paper discharging rollers 30, 32 and 34 are driven to rotate at the same speed.

It is to be noted that this aspect of the present invention is universally applicable to the situation where a curved passage for transporting a sheet or recording paper is provided.

The fourth distinctive aspect of the present invention relates to the buffer guide pipe 22. As described previously, the buffer guide pipe 22 is rotatably supported at the free end of a bracket which is pivotally supported at the rotating shaft for the guide pipe 21. Thus, the buffer guide pipe 22 may pivot between the advanced position indicated by the dotted line and the retracted position indicated by the solid line around the pivot or rotating shaft for the guide pipe 21. The buffer guide pipe 22 rests on the ink ribbon IS extending between the guide pipes 21 and 23 by its own weight. And, the buffer guide pipe 22 may take any position between the advanced and retracted positions depending on the degree of tension acting on the ink ribbon IS. The following advantages may be obtained by using such a buffer guide pipe 22.

That is, in the first place, there is obtained a buffer effect in feeding the ink ribbon IS toward the recording section. In other words, the mass of the ink ribbon IS wound in the form of a roll is prevented from applying the effect of inertia load to the feeding force at the recording section. Second, including the occasion of ink ribbon replacement, since the buffer guide pipe 22 always keep the ink ribbon IS in tension, creases are prevented from occurring in the ink ribbon IS. Third, when the unused portion of ink ribbon IS is pulled backward due to reversed rotation of platen roller 20 upon completion of printing operation, the length of ink ribbon IS pulled backward is absorbed by the pivotal movement of buffer guide pipe 22 so that occurrence of a slack or twisting in the ink ribbon IS is prevented.

It is to be noted that such a buffer guide pipe 22 may be applied to any other types of transfer type thermal printers. The guide roller 24 also has a similar buffer effect and it serves to guide the recording paper S to be smoothly lead into the recording section.

The fifth distinctive aspect of the present invention relates to the manner of mounting the ink ribbon IS. As described previously, the ink ribbon IS is originally wound in the form of a roll and it is detachably mounted in position in the printer upper half. The roll of ink ribbon IS is then unwound to be fed toward the recording section. It is important, however, that the ink sheet IS be easy for replacement and mounting and detachment of ink ribbon IS to or from the printer be easy. In the illustrated embodiment, the ink ribbon IS is set in position with a supply spool SP on which the ink ribbon IS is wound is inserted to be supported by a support member 401 and a leaf spring 402, as shown in FIG. 5.

The supply spool SP is slightly larger in width than the ink ribbon IS and thus it projects slightly on both ends of the ink ribbon IS wound in the form of a roll. Both ends of the supply spool SP are rotatably supported by a support structure shown in FIG. 5. Thus, in order to mount the ink ribbon IS in position for operation, it is only necessary to push the supply spool SP into the support member 401 through its opening. The supply spool SP thus pushed into position may be maintained in position stably as urged by the leaf spring 02. In order to detach the supply spool SP from the printer, it is only necessary to pull the supply spool SP from the support member 401 through its opening against the force of spring 402. When the supply spool SP is set in position inside the support member 401 as shown in FIG. 5, it may rotate with respect to the support member 401. Thus, as the platen roller 20 is driven to rotate to pull the ink ribbon IS forward, the supply spool SP rotates counterclockwise as indicated by the arrow in FIG. 5 to supply the ink ribbon IS as unwound from the roll.

Figure 5:
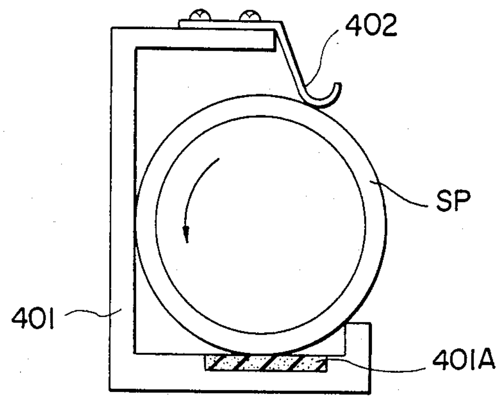
FIG. 5 is a schematic illustration showing a structure for rotatably holding a take-up spool for ink ribbon which is incorporated in the printer of FIG. 1.

In the embodiment illustrated in FIG. 5, that portion of the support member 401 on which the supply spool rests is provided with a frictional element 401A, such as cork. The remaining portion of support member 401, spring 402 and supply spool SP are all quite slippery. For this reason, when the supply spool SP rotates counterclockwise, it experiences friction against the frictional element 401A; however, this friction serves to cause the supply spool SP to be pressed against the support member 401 so that the supply spool SP may be securely maintained in the printer upper half quite stably while it is being held in rotation. It is to be noted that such a supply spool supporting structure may be applied to any appropriate type of printers.

The sixth distinctive aspect of the present invention is concerned with the bracket 26 for supporting thereon the thermal printhead 25. In order to carry out a proper transfer type thermal printing operation, it is important that a relative positional relation between the platen roller 20 and thermal printhead 25 be accurately maintained. This is the problem of alignment among components.

In order to insure a proper transfer type thermal printing operation, it is also important that the platen roller 20 be brought into pressure contact with the thermal printhead uniformly along its longitudinal direction. However, since the thermal printhead 25 is elongated in shape, when a pressure force is applied at each end thereof in the direction of its thickness, it tends to become deflected such that the pressure force is smaller at the center as compared with the end portions, thereby hindering to obtain a uniform pressure force along the entire contact line between the platen roller 20 and thermal printhead 25.

In the illustrated embodiment, the bracket 26 to support thereon the thermal printhead 25 is so structured to solve these problems relating to alignment and uniformity in pressure force as in the following manner.

Figure 6:
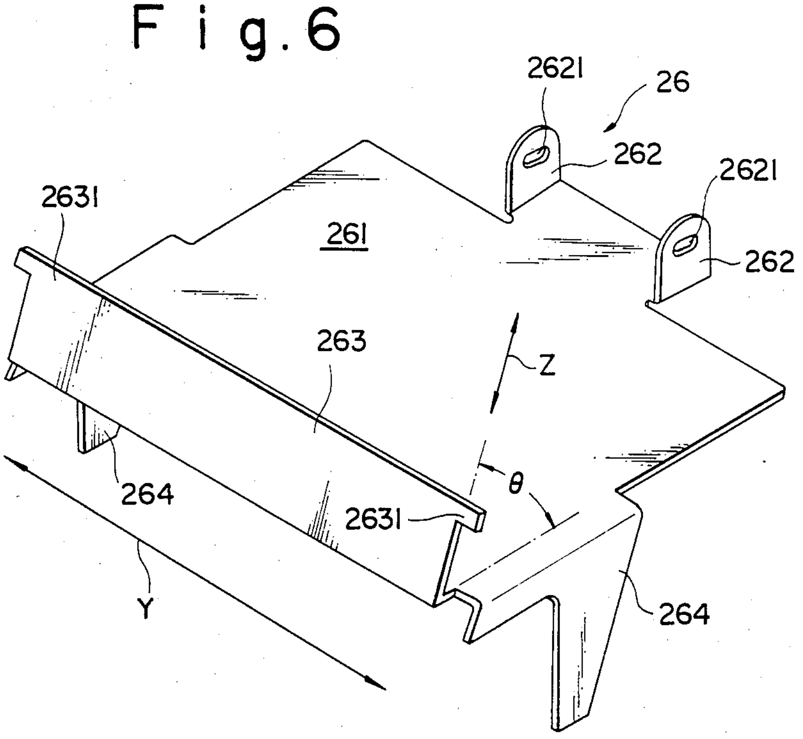
FIG. 6 is a perspective view of a support bracket for supporting thereon a thermal printhead, which is also advantageously incorporated in the printer of FIG. 1.

FIG. 6 shows the overall structure of bracket 26 embodying the present invention. As shown, the bracket 26 includes a flat plate portion 261, a pair of support portions 262, a bent portion 263 and a pair of engaging portions 264, which are formed integrally as a unit. The thermal printhead 25 is fixedly attached to the bottom surface of the flat plate portion 261. When so attached, the thermal printhead 25 has its lengthwise direction in parallel with the Y direction indicated in FIG. 6. It is to be noted that in FIG. 6 the bracket 26 is shown to be reduced in size in the Y direction for convenience in drawing, but the actual bracket 26 is substantially elongated in the Y direction so as to allow the thermal printhead 25 to be fixedly attached thereto.

Each of the support portions 262 is formed with a slot 2621, into which a pin (not shown) fixedly planted in the frame of upper cover or printer upper half is loosely fitted, so that the bracket 26 may be pivotally mounted in the printer upper half. The bent portion 263 is inclined upwardly at an angle $\theta$ with respect to the flat plate portion 261. Here, regarding the bent portion 263, the Z direction indicated in FIG. 6 will be called widthwise direction of bent portion 263. It is to be noted that the angle $\theta$ is an acute angle, preferably in the range between approximately 60° and 80°. The bent portion 263 is formed with projections 2631 on both ends in the Y direction, and each of these projections 2631 will be used for engagement of one end of a coil spring, as will be described further in detail later. The engaging portions 264 are defined on both ends of the flat plate portion 261 in the Y direction as bent downwardly.

Figure 7:
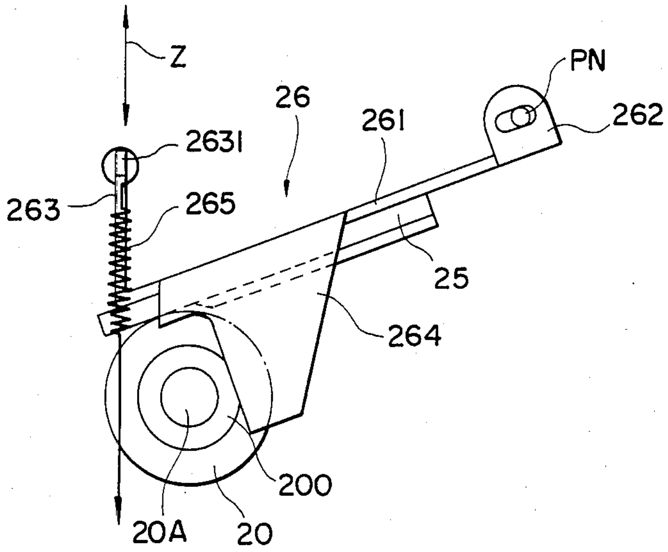
FIG. 7 is a schematic illustration mainly showing the structural relationship between the bracket supporting thereon the thermal printhead and a platen roller, which constitutes part of the internal structure of the printer of FIG. 1.

Referring now to FIG. 7, there is shown the condition in which the printer upper half is pivotted closed with respect to the printer lower half and the platen roller 20 is pressed against the thermal printhead 25. As shown, there is provided a coil spring 265 having its one end engaged with the projection 2631 of bracket 26 and the other end engaged with an appropriate point in the printer upper half at each end of the bracket 26. Thus, the coil springs 265 normally apply a force to bring the thermal printhead 26 into pressure contact with the platen roller 20. The platen roller 20 includes its rotating shaft 20A onto which is rotatably fitted an aligning ring 200, which, in turn, is fixedly attached to the printer lower half.

Now, as the printer upper half is gradually brought into the closed position from the open position, the thermal printhead 25 comes into contact with the platen roller 20 at its top peripheral surface and the engaging portions 264 of bracket 26 are also brought into contact with the respective aligning rings 200. As the printer upper half is further moved and finally brought into its closed position, the thermal printhead 25 receives an upward pressure force from the platen roller 20 so that the bracket 26 slightly pivots clockwise around the pins PN thereby establishing the condition shown in FIG. 7. In this instance, the springs 265 become extended and its spring forces cause the thermal printhead 25 to be pressed against the platen roller 20. Of course, under normal circumstances, the ink ribbon IS is present between the thermal printhead 25 and platen roller 20. In the illustrated embodiment, through the engagement between the engaging portion 264 of bracket 26 and the corresponding aligning ring 200, there may be obtained an accurate relative positional relation between the platen roller 20 and thermal printhead 25.

The coil springs 265 are provided to extend in the Z direction or the widthwise direction of bent portion 263 of bracket 26 so that the forces of these springs 265 act in the Z direction. Since the forces imparted by the springs 263 on the bent portion 263 are directed in the widthwise direction of bent portion 263, a relatively strong rigidity against bending is exhibited by the bent portion 263. Thus, even if forces are applied at both ends of bent portion 263 in the Y direction, no bending deflection is produced in the bent portion 263. Accordingly, the thermal printhead 25 may be securely brought into contact with the platen roller 20 uniformly along its full length.

As mentioned previously, the bent portion 263 is bent to define an acute angle with respect to the flat plate portion 261. Thus, when a pressure force is applied by the coil springs 265 as described above, it produces a force component acting in parallel with the flat plate portion 261 and directed perpendicular to the Y direction. This force component serves to cause the engaging portion 264 of bracket 26 to be pressed against the aligning ring 200 of platen roller 20. With this structure, engagement between the engaging portion 264 and aligning ring 200 is secured, which contributes to maintain the relative positional relation between the thermal printhead 25 and platen roller 20 properly at all times.

The seventh distinctive aspect of the present invention relates to a structure for feeding a sheet of recording paper S to the recording section. Although the platen roller 20 is driven to rotate intermittently during printing operation, it is driven to rotate at its maximum speed during a process to set the recording paper S at the recording section. However, to drive the platen roller 20 and the registration rollers 18A and 18B all at the same speed is not advantageous from the viewpoint of driving efficiency. Accordingly, in the present embodiment, it is structured that the transportation speed for supplying the recording paper S to the recording section is set faster than the transportation speed established by the platen roller 20, thereby allowing to carry out printing for the very first sheet of recording paper S sooner. In the preferred embodiment, the transportation speed of recording paper S established by the registration rollers 18A and 18B is set approximately 2.5 times of the transportation speed established by the platen roller 20.

As described previously, the registration rollers 18A and 18B cease to be driven as soon as the leading edge of recording paper S reaches the recording section as transported by the platen roller 20. However, as described above, since the transportation speed differs significantly between the registration and platen rollers, an inventive concept must be introduced so as to carry out the above-mentioned setting of recording paper S at the recording section. That is, for an excellent setting of recording paper S, it is ideal if the transportation speed is identical between the registration and platen rollers.

Figure 8:
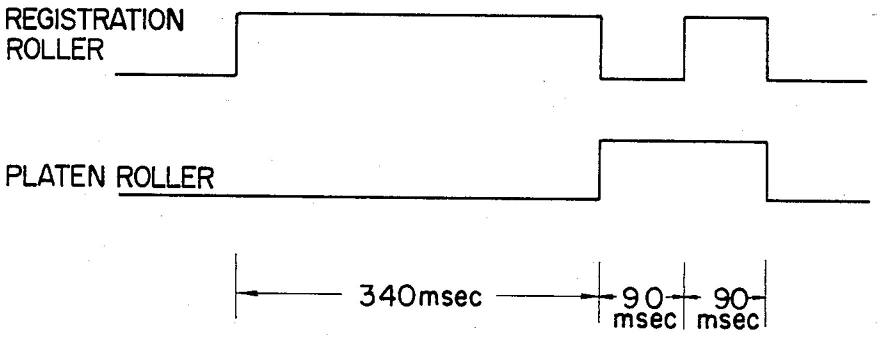
FIG. 8 is a timing chart which is useful for explaining the timed operation between the registration roller and the platen roller in the printer of FIG. 1.

The preferred manner of carrying out such setting of recording paper S in accordance with the present invention will now be described with particular reference to FIG. 8. As shown, at first, while maintaining the platen roller 20 in a non-rotating state, the registration rollers 18A and 18B are driven to rotate for 340 msec, so that the recording paper S is caused to move toward the recording section by means of the registration rollers 18A and 18B and its leading edge reaches the contact line between the platen roller 20 and thermal printhead 25 with the ink ribbon IS sandwiched therebetween, whereby the recording paper S becomes somewhat warped as it is further driven by the registration rollers 18A and 18B. Then, the registration rollers 18A and 18B cease to be driven to rotate, and, at the same time, the platen roller 20 starts to be driven so that it rotates counterclockwise for 180 msec. During the first half (90 msec) of this 180 msec period, the platen roller 20 causes the leading edge of recording paper S to be fed into the recording section thereby substantially absorbing the warp of recording paper S. During the next half (90 msec), the registration rollers 18A and 18B are again driven to rotate and the platen roller 20 is also driven to rotate to have the recording paper S properly and completely set in the recording section.

The time period of 90 msec from the time when the registration rollers 18A and 18B once cease to be driven to rotate to the time when the registration rollers 18A and 18B are again driven to rotate is a time period to absorb a difference in transportation speed between the platen and registration rollers. In the case of absence of such an intermediate time period, the recording paper S will warp more appreciably thereby hindering to carry out smooth setting of recording paper S.

The mechanism of above-described setting of recording paper may be explained as in the following manner. That is, as described previously, it is again assumed that the transportation speed established by the platen roller is V and that by the registration rollers is 2.5 V. Under the condition, focusing on the time period of 180 msec during which the platen roller 20 is driven to rotate, the registration rollers 18A and 18B stop rotation for the first half 90 msec and then resume rotation for the next half 90 msec. Accordingly, the average transportation speed established by the registration rollers 18A and 18B for this time period of 180 msec is $(90\ \text{msec}\times 2.5\ \text{V})/180\ \text{msec} = 1.25\ \text{V}$. A difference between this average transportation speed and the transportation speed V of platen roller 20 is 0.25 V. That is, the above-mentioned setting operation is directed to carry out the desired paper setting operation as smoothly as possible by causing the average transportation speed of recording paper S to approach the transportation speed by the platen roller 20 by driving the registration rollers 18A and 18B intermittently. Thus, if at all possible, a more ideal paper setting operation may be carried out by controlling to drive the registration rollers 18A and 18B more finely thereby allowing the average transportation speed to be more closer to the transportation speed established by the platen roller 20. However, from practical viewpoint, the control scheme shown in FIG. 8 is more than sufficient.

The eighth distinctive aspect of the present invention relates to timing in feeding recording paper S during continuous printing operation. That is, in the present transfer type thermal printer, printing operation is initiated by a print command supplied from the host system (FIG. 4). In the case of a single page printing operation, this print command is turned off when a "print in progress" signal is supplied from the printer. However, in the case of a continuous printing operation, this command remains on. During such a continuous printing operation, if the print command is on at the time when the trailing edge of the last preceding recording paper S has been detected by the sensor 17, the next following sheet of recording paper S is fed. This recording paper S is set in a standby state with its leading edge in abutment against the nip between the registration rollers 18A and 18B and it is transported to the recording section at such a timing that its leading edge portion does not overlap the trailing edge portion of the last preceding recording paper S. This operation is carried out under the control of CPU provided in the control unit 35.

The ninth distinctive aspect of the present invention relates to timing in carrying out the pull-back operation of ink ribbon. As described previously, in order to minimize the waste of ink ribbon IS, the ink ribbon IS is preferably pulled backward. That is, upon completion of printing for the last page, a laminate of recording paper S and ink ribbon IS is advanced further, and after the recording paper S having been separated from the ink ribbon IS by the relay roller 27, that portion of ink ribbon IS which extends between the point of separation and the recording section and thus has not been used is pulled backward until the unused portion becomes located at the recording section. In order to implement this, it is necessary to detect the timing when the trailing edge of recording paper S has reached the point of separation. It is conceivable to use the length of time period, e.g., from the point in time when the sensor 17 has detected the trailing edge of recording paper S to the point in time when that trailing edge reaches the point of separation, in order to carry out such a detection method.

However, in the present embodiment, a method is adopted in which lines having no image information, or all "white", are skipped so as to increase the printing speed. Presence and absence of skips differ for each image information, and depending on the number of skips, the length of time period from the time of detecting the trailing edge of recording paper S by the sensor 17 to the time of the trailing edge reaching the point of separation differs. For this reason, detection by time period as described above is not possible. Under the condition, in accordance with the preferred embodiment of the present invention, such detection is carried out by counting the number of drive lines of platen roller 20 from the time when the sensor 17 has detected the trailing edge of recording paper S to the time when the trailing edge reaches the point of separation. This operation is also carried out under the control of CPU in the control unit 35.

The tenth distinctive aspect of the present invention relates to monitoring of temperature. In the illustrated embodiment, the components producing significant heat include the thermal printhead 25 and a power supply. The amount of heat produced depends on the contents of image information, i.e., more white dot information or more black dot information, so that the instantaneous power supply capacity must have an upper limit (in the case where a single line is all black), but if thermal designing is carried out in compliance with this upper limit, the entire device becomes bulky and thus not advantageous.

Under the condition, in the illustrated embodiment, for the maximum power consumption of 300 W, thermal designing of power supply is carried out with 120 W, but the thermal printhead 25 is not provided with special heat-releasing plates or the like. However, a thermistor is mounted as a heat level detecting element in the thermal printhead 25 and the power transistor of power supply to monitor temperature by the CPU of control unit 35. This thermistor is also used to determine the pulse width of image signal as will be described in detail later.

During printing operation, if the temperature of either of thermal printhead 25 or power supply transistor (not shown) has exceeded a predetermined level, i.e., 60 ° C. for thermal printhead 25 and 110 ° C. for power supply transistor, the on-going thermal printing operation is allowed to continue until it is completed, but, thereafter, the printer is set in a "standby" state for a predetermined time period, during which the printer is allowed to cool down without carrying out printing operation. Experimentally, it has been found that, for typical operation of printing characters, the "standby" state has not been entered even for 2 hours of continuous printing operation. It is thus considered that under normal printing conditions the "standby" state is hardly established.

The eleventh distinctive aspect of the present invention relates to the control over the level of energy applied to the thermal printhead 25. As described previously, each of the individual heat-producing elements constituting the write-in section of thermal printhead 25 becomes momentarily heated to the temperature of approximately 300 ° C. when a pulse signal is applied thereto as an image signal. Thereafter, due to natural cooling, the heat is dissipated and the temperature gradually goes down. These rising and falling characteristics in temperature change depending on the temperature of substrate of thermal printhead 25 and the pulse width of pulse current.

As described above, the temperature falling characteristic after having been heated to a higher temperature with the application of a pulse current is not so steep as compared with the temperature rising characteristic. Thus, if the same heat-producing element is driven repetitively, the next following heating step starts before it has cooled down sufficiently. If this happens, the temperature of heat-producing element increases cumulatively, which then could cause a damage to the ink ribbon IS and/or deterioration in image resolution due to excessive transfer of ink.

On the other hand, in the illustrated embodiment, the above-mentioned problem has been solved by controlling the level of energy applied to the thermal printhead 25. That is, in the present embodiment, the write-in section of thermal printhead 25 is divided in the longitudinal direction into four blocks and the write-in operation is carried out twice for each line. Furthermore, every time when write-in operation is carried out, it is compared with the information for the last preceding line, in which the write-in operation is carried out twice for a bit or pixel whose last preceding bit is a white bit and the write-in operation is carried out only once for a bit whose last preceding bit is black. The control of this operation is implemented by the bit unit energy control circuit shown in FIG. 4.

That is, when the bit unit energy control circuit receives one line of image signal from the video interface, the head driver is activated with this image signal and this image signal is stored into the RAM. Then, when an image signal for the next following line is received, the image signal of the last preceding line is read out and after comparison between the signals, the write-in operation is carried out only for those bits whose last preceding bits are all white.

Incidentally, as described previously, since the rising and falling characteristics of a heat-producing element also depends on the substrate temperature of thermal printhead 25, if the substrate temperature itself increases, even with the control over the level of energy applied for each bit, there will be a cumulative accumulation of heat to present problems, such as damage to the ink ribbon IS. Under the condition, in accordance with the illustrated embodiment, use is made of the pulse width determining circuit (FIG. 4) to control the pulse width of current pulse to be applied to each heat-producing element in response to the substrate temperature to obviate the above-mentioned problem. That is, as the substrate temperature goes up, it is so controlled to make the pulse width smaller. Of course, such a control may be carried out using the CPU in the control unit 35. The detection of substrate temperature may be carried out using a thermistor as mentioned previously.

The twelfth distinctive aspect of the present invention relates to a scheme of shifting the application of image signal to the write-in section for each sheet of recording paper S in the case of continuous printing operation for the same formatted image. Among images to be thermally printed, there is an image, such as a slip, which contains ruled lines. In the case of printing images of the same format having such ruled lines repetitively in a continuous manner, particular ones of heat-producing elements are used repetitively so as to print the ruled lines, which could be detrimental to the life of thermal printhead because of concentrated usage of particular heat-producing elements. In view of this, in accordance with the present embodiment, it is so structured that the application of image signal is shifted by one bit at the write-in section for each sheet of recording paper S over an 8-bit range. With such a structure, the image printed on a sheet of recording paper S comes to be shifted in position one sheet from another; however, since such a shift is limited to 8 bits at maximum, which corresponds to 1 mm, this may be practically neglected.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A transfer type thermal printer comprising:

transporting means for transporting a recording medium along a predetermined paper transporting path which includes a recording section where recording is effected on said recording medium;

a thermal printhead disposed at said recording section for providing a heat pattern in accordance with an image signal supplied thereto;

a platen roller disposed to be normally pressed against said printhead;

ink ribbon feeding means for a feeding a heatsensitive ink ribbon along a predetermined ink ribbon feeding path, said ink ribbon passing through said recording section as sandwiched between said printhead and said platen roller;

control means for controlling the operation of said transporting means, printhead, platen roller and ink ribbon feeding means in a timed relation; and housing means for housing therein said transporting means, printhead, platen roller, ink ribbon feeding means and control means, said housing means including an upper housing half and a lower housing half which is secured to said upper housing half to allow said upper housing half to be pivoted open or closed generally along said predetermined ink ribbon feeding path, wherein said ink ribbon feeding means includes a supply roll rotatably mounted to said upper housing half, a take-up spool rotatably mounted to said lower housing half for taking up said ink ribbon after having been used at said recording section and as unwound from said supply roll.

2. The printer of claim 1 wherein said printhead is mounted to said upper housing half and said platen roller is mounted to said lower housing half.

3. The printer of claim 2 further comprising storing means for storing a plurality of recording mediums in the form of a stack, and wherein said transporting means includes first transporting means for transporting said recording mediums stored in said storing means one by one to said recording section along a first transporting path.

4. The printer of claim 3 wherein said storing means includes a cassette which stores therein said recording mediums and which may be detachably mounted to said lower half housing.

5. The printer of claim 3 wherein said first transporting means includes an automatic feeding mechanism for feeding said recording mediums one by one under the control of said control means.

6. The printer of claim 5 wherein said automatic feeding mechanism includes a feed roller resting on the topmost one of said stack of recording mediums, a transport roller for transporting said recording medium toward said recording section when fed by said feeding roller and a back-up roller for returning said recording mediums when fed two or more at the same time to said storing means excepting the topmost one thereby securing that said recording mediums are fed one by one at all times.

7. The printer of claim 3 further comprising an opening defined in said lower housing half thereby allowing a recording medium to be fed manually by an operator and wherein said transporting means includes second transporting means for transporting said manually fed recording medium to said recording section along a second transporting path.

8. The printer of claim 7 further comprising a door member which is pivotally supported thereby allowing it to be pivotted open or closed with respect to said opening.

9. The printer of claim 7 wherein said first and second transporting paths meet at a registration section halfway to said recording section and said first and second transporting means includes common transporting means for transporting said recording medium from said registration section to said recording section.

10. The printer of claim 9 wherein said common transporting means includes a pair of registration rollers disposed at said registration section one at each side of said path, said registration rollers being driven to rotate intermittently under the control of said control means to transport said recording medium in timed relation with the activation of said printhead.

11. The printer of claim 10 further comprising first sensing means located adjacent to said registration section for sensing the passage of said recording medium either through said first transporting path or through said second transporting path, and wherein said control means supplies an automatic feed drive signal to feed said recording mediums stored in said storing means one by one automatically and said control means identifies said recording medium as having been fed manually when said first sensing means senses said recording medium without said drive signal having been supplied.

12. The printer of claim 1 including a relay roller rotatably mounted to said upper housing half at a location between said recording section and said take-up spool.

13. The printer of claim 12 wherein said relay roller is driven to rotate at a first peripheral speed which is larger than a second peripheral speed established by said platen roller.

14. The printer of claim 13 wherein said relay roller has a small diameter and disposed so as to change the direction of advancement of said ink ribbon from said recording section to said take-up spool thereby allowing said relay roller to function as a separator for separating said recording medium from said ink ribbon after recording at said recording section.

15. The printer of claim 7 wherein said transporting means includes third transporting means extending from said recording section to a tray which is provided at top of said upper housing half, and said third transporting means includes a plurality of paired rollers, one of which is a driving roller and the other of which is a follower roller, which are disposed along a curved path extending from said recording section to said tray spaced apart from one another, said driving rollers all having the same peripheral speed.

16. The printer of claim 15 wherein said driving and follower rollers are arranged along said curved path such that said driving rollers contact a rear side of said recording medium in transportation and said follower rollers contact a front side of said recording medium, on which an image recorded at said recording section is present.

17. The printer of claim 10 wherein during setting of said recording medium at said recording section, a third transportation speed established by said registration rollers for transporting said recording medium is set larger than a fourth transportation speed established by said platen roller and said control means causes said registration rollers to be driven on and off at least once while said platen roller is driven to rotate to set said recording medium in said recording section.

18. The printer of claim 1 further comprising a bracket which is pivotally mounted in said upper housing half and said printhead is fixedly attached to said bracket.

19. The printer of claim 18 further comprising biasing means for normally biasing said bracket toward said platen roller when said upper housing half is pivotted closed with respect to said lower housing half.

20. The printer of claim 19 wherein said bracket is provided with an engaging portion and said platen roller is provided with an aligning ring, whereby said engaging portion comes into engagement with said aligning ring when said upper housing half is pivotted closed with respect to said lower housing half thereby allowing to secure a proper relative positional relation between said printhead and said platen roller at all times.

* * * * *